Patented May 7, 1935

2,000,889

UNITED STATES PATENT OFFICE 2,000,889

DIRECT DEVELOPED AZO DYES AND THEIR PRODUCTION

Ernest F. Grether and Gerald H. Coleman, Midland, Mich., assignors to The Dow Chemical Company, Midland, Mich., a corporation of Michigan No Drawing. Application October 19, 1929, Serial No. 401,012

5 Claims. (Cl. 260—95)

The present invention is concerned with azo dyes of the direct-developed type which may be produced by coupling diazotized amino-nitro-diphenylamines into azo dye components, particularly into hydroxynaphthalene compounds, and more particularly by coupling 4-amino-2',4'-dinitro-diphenylamines into imidazoles of 2.3-hydroxynaphthoic acid.

It is known that azo dyes which are fast to light and washing are produced by coupling diazotized aromatic amines into Naphthol AS, the latter being 2.3-hydroxynaphthoic acid anilide, or into related compounds. We have found that diazotized 4-amino-2',4'-dinitro-diphenylamine and its substituted derivatives may be coupled into imidazoles of hydroxy aromatic acids, or their substitution products, whereby new and useful water-insoluble azo dyes are formed.

Our invention, then, consists of the steps and new products hereinafter fully described and particularly pointed out in the claims, the following description setting forth but several of the various ways in which the principle of our invention may be used.

The herein described new azo dyes dye cotton and other fibers directly in fast and clear shades. They may be prepared by coupling the aforesaid diazo components into the above mentioned hydroxy-compounds in any of the ordinary ways, e. g. dyes may be applied by developing on the fiber, by printing a diazo solution upon padded goods according to the usual method, by using the nitrosamine salts of the corresponding bases, or may be prepared in substance for use as pigments. Mordanting or other auxiliary treatment for promoting the absorption of the dye by the fiber, or after-treatment with metal salts such as chromium, copper, or aluminum salts, for fixing the dye or modifying its color tone may be optionally employed in conjunction with the dyeing operation without departing from the spirit of our invention which is intended to include not only the dyes themselves but also material dyed therewith.

A preferred manner in which our invention may be carried out is illustrated in the following specific example.

Example

Cotton fiber was impregnated with an aqueous alkaline solution of 2'-(2,3-hydroxynaphthyl)-4,5-para-tolylene-imidazole. The impregnated fiber was then rinsed in water and immersed in a dilute aqueous sodium carbonate solution to which had been added a diazo solution of 4-amino-2',4'-dinitro-diphenyl-amine.

The dye was raspberry in color, the probable formula being:—

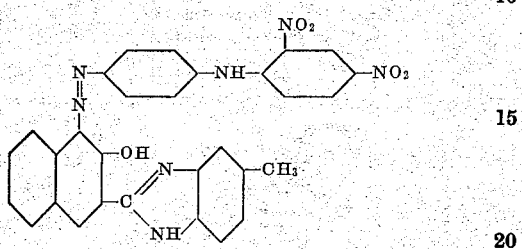

The "Standard Color Chart of America", (1928 edition), issued by "The Textile Color Card Association of the United States, Inc." is used to designate the color of the above mentioned dye.

While in the examples, cotton fibers have been referred to as the material to be dyed with the herein described new azo dyes, other natural or synthetic fibers may likewise be dyed therewith, such as, wool, silk, rayon and the like.

Furthermore, we do not limit the invention to the use of the specifically aforementioned intermediates. As diazo components may be used the diazo compounds prepared from substituted derivatives of the above utilized diazo component, such as the halogen, nitro, alkyl, ether, or other derivatives.

Other modes of applying the principle of our invention may be employed instead of the one explained, change being made as regards the steps or material employed, provided the steps or ingredients stated by any of the following claims or the equivalent of such be employed.

We therefore particularly point out and distinctly claim as our invention:—

1. The method of making an azo dye which comprises coupling diazotized 4-amino-2',4'-dinitro-diphenylamine with an imidazole of 2,3-hydroxynaphthoic acid.

2. As a new product, an azo dye having the general formula;
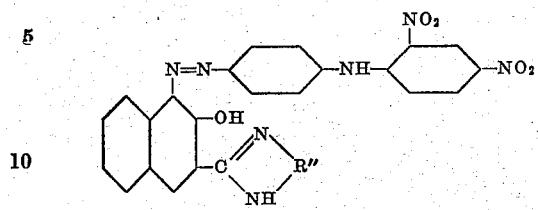
wherein R'' represents a residue of the benzene series.
3. As a new product, an azo dye having the formula;
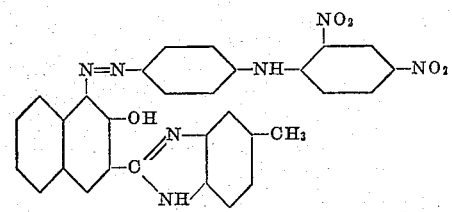
4. Fiber dyed with a dye as claimed in claim 2.
5. Fiber dyed with a dye as claimed in claim 3.
ERNEST F. GRETHER.
GERALD H. COLEMAN.